United States Patent [19]

Reichert

[11] 4,341,383
[45] Jul. 27, 1982

[54] ELECTRONIC BASKETBALL GAME

[75] Inventor: David A. Reichert, Carson, Calif.

[73] Assignee: Mattel, Inc., Hawthorne, Calif.

[21] Appl. No.: 174,986

[22] Filed: Aug. 4, 1980

[51] Int. Cl.³ .............................................. A63F 9/00
[52] U.S. Cl. ................................. 273/85 G; 273/313
[58] Field of Search ................ 273/85 G, 88, 94, 237, 273/DIG. 28, 1 E, 1 GC; 340/323 R; 364/410; 235/92 G A

[56] References Cited

U.S. PATENT DOCUMENTS

| 3,874,669 | 4/1975 | Ariano et al. | 273/85 G |
| 4,093,223 | 6/1978 | Wilke et al. | 273/94 |
| 4,162,792 | 7/1979 | Chang et al. | 273/85 G |
| 4,249,734 | 2/1981 | Bromley | 273/94 |
| 4,249,744 | 2/1981 | Bromley | 273/313 |

Primary Examiner—Vance Y. Hum
Attorney, Agent, or Firm—Reagin & King

[57] ABSTRACT

A portable electronic basketball game having a housing containing control circuitry and mounting a display and input controls. The display shows both offensive and defensive players and a ball. The defensive players may be controlled to undertake a plurality of defenses and the offensive players may pass between one another in a preferred embodiment. The preferred embodiment also featured a twenty-four second clock, a three-second clock, foul shots, and three-point long distance field goals.

15 Claims, 28 Drawing Figures

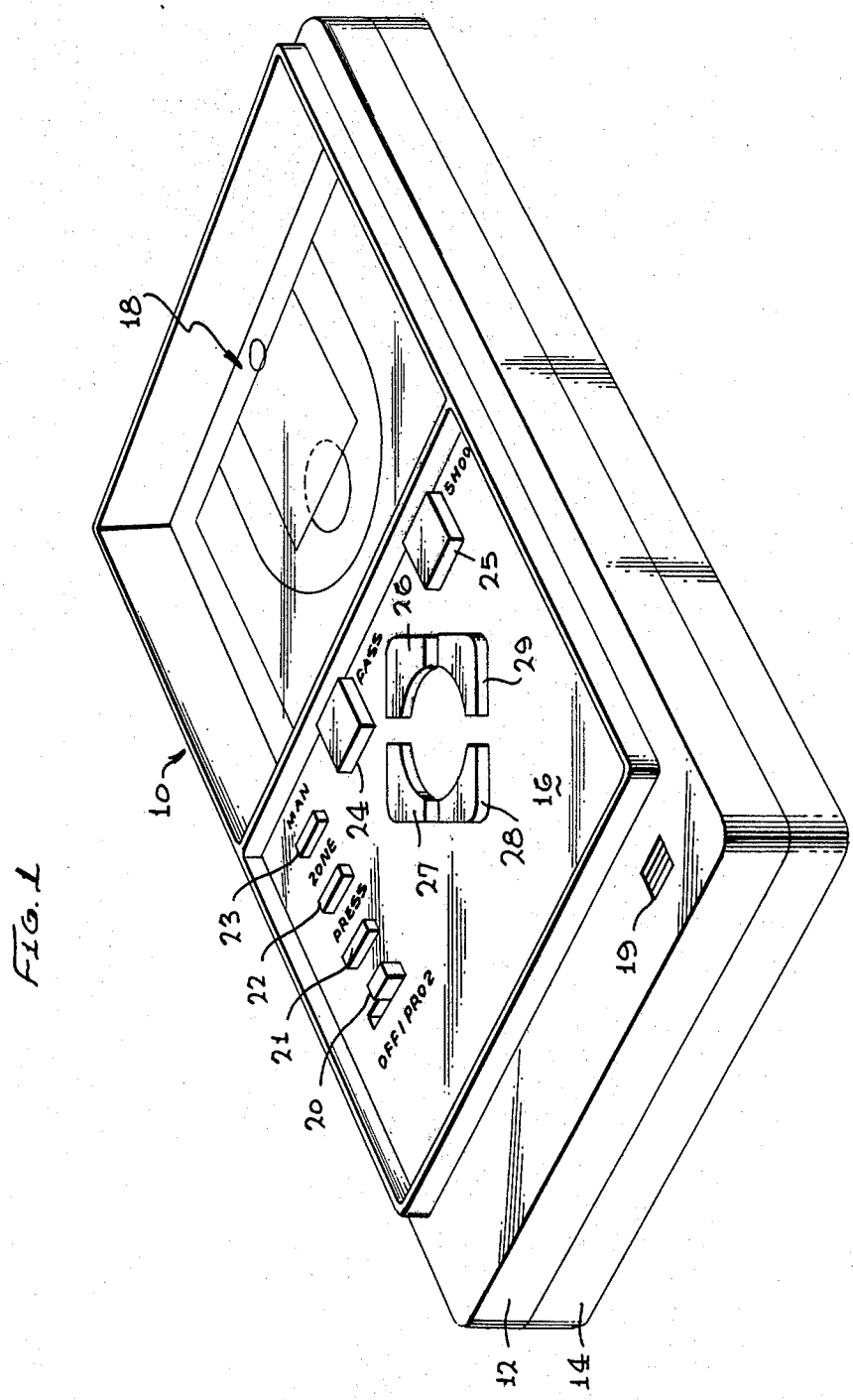

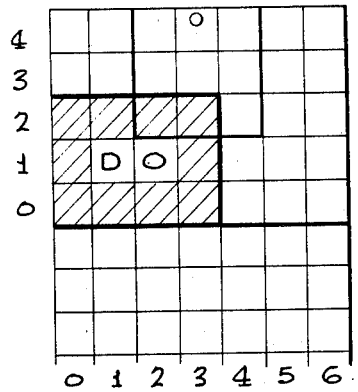
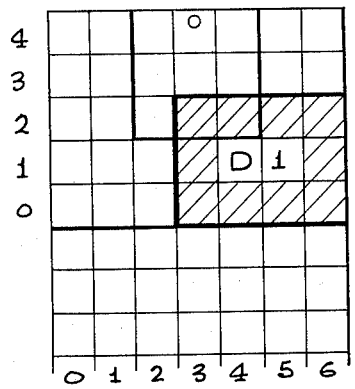
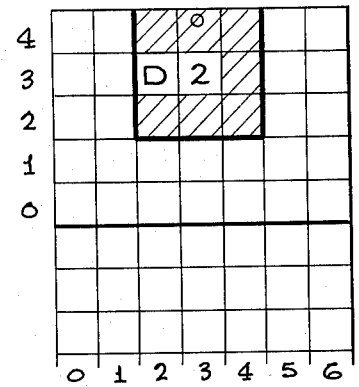
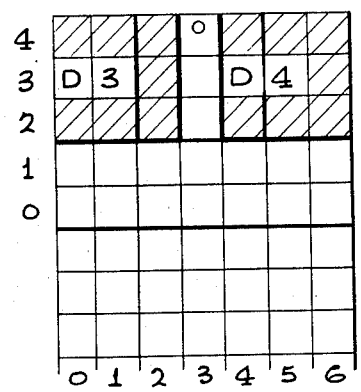
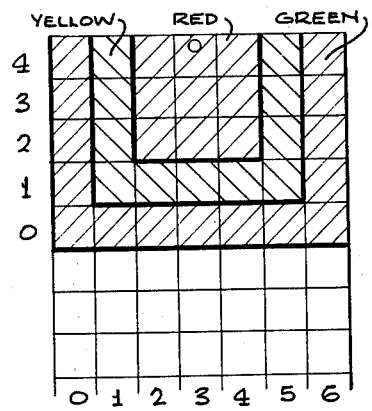
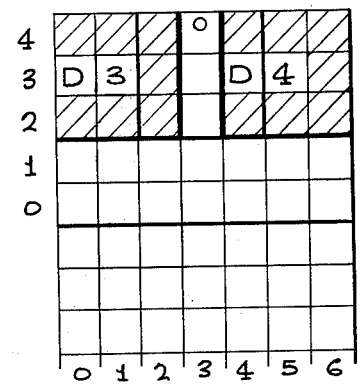
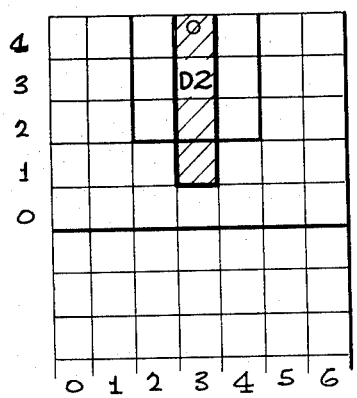
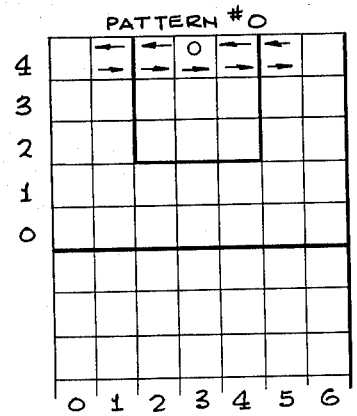
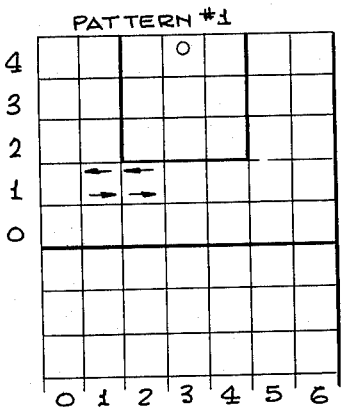

FIG. 2(j) PATTERN #2

FIG. 2(k) PATTERN #3

FIG. 2(l) PATTERN #4

FIG. 2(m) PATTERN #5

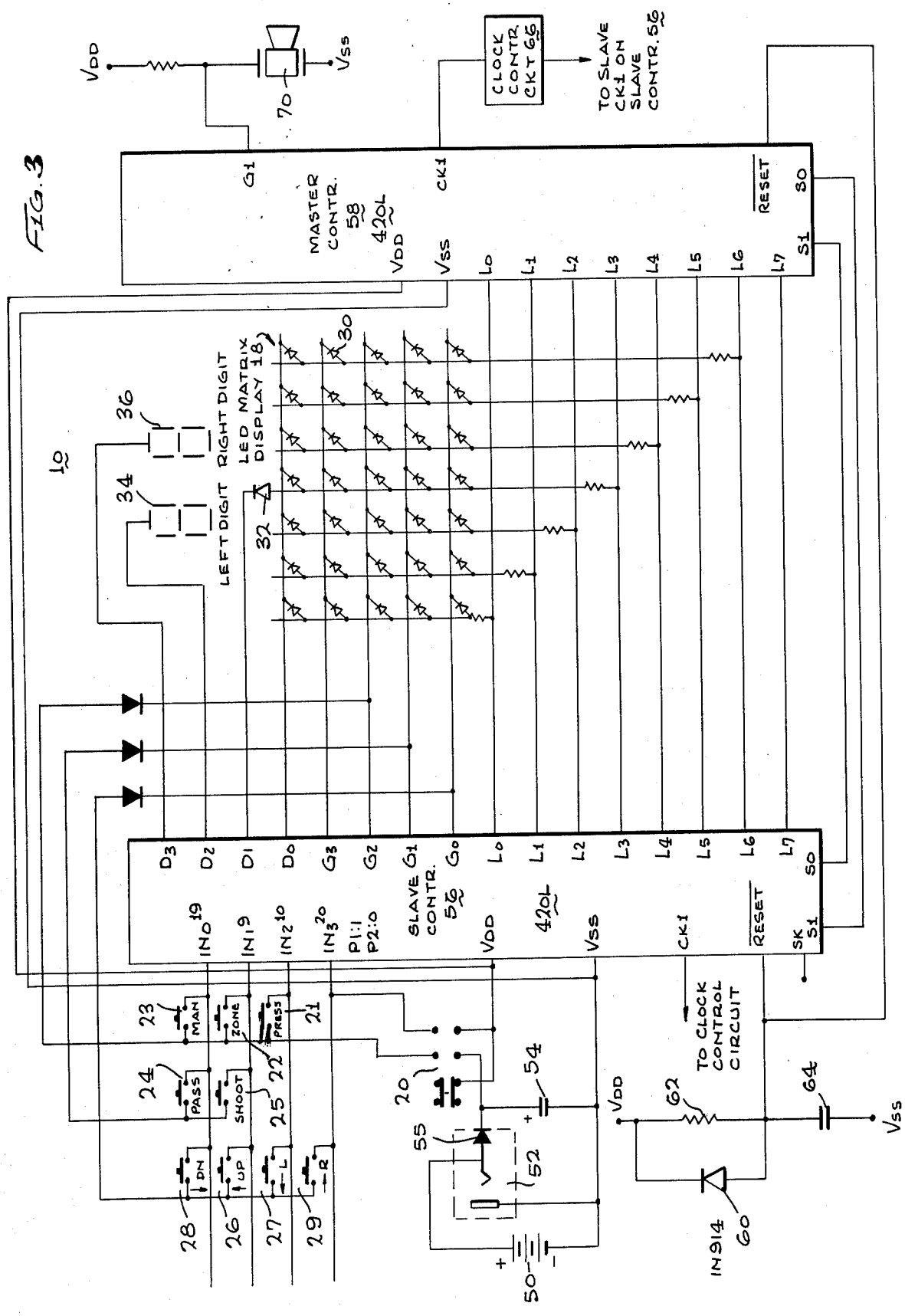

ELECTRONIC BASKETBALL GAME

BACKGROUND OF THE INVENTION

This invention relates to games and, more particularly, to electronic games for simulating the play of athletic games.

People appear to have been involved in the playing of games since the beginning of recorded history. The almost universal interest in games seems to be due to the excitement engendered by competition and chance. Competitive games are probably more exciting, other factors being equal; but, they normally require that a number of persons be involved in each such game. Many competitive games require a large number of players, large fields, and a substantial amount of equipment.

Recently, various improvements in electronic circuitry have allowed the reduction in size and cost of data processing circuitry and have led to electronic circuits which simulate the play of various ones of the players in certain well known games. In these electronic games, a person moves an electronic player against electronic competitors thereby eliminating the necessity for some or all of the other human players. Many of these electronic games are quite expensive. Often, the game must be connected to a television set to provide a display upon which the game may be presented and, consequently, cannot be moved from place to place.

Recently, a number of portable electronic games have been devised by which one or two persons may play a particular simulated sports game such as football, basketball, or baseball. These portable games have their own built-in displays and are much less expensive, in general, than those which must be connected to a television set. Their small size allows them to be carried about and used almost anywhere. However, these portable electronic games have relatively small displays, contain a limited amount of circuitry, and are usually powered by battery. Consequently, the portable electronic games heretofore devised have been relatively unsophisticated as contrasted to those which are associated with television sets.

It is, consequently, an object of this invention to provide a new and improved portable electronic basketball game.

It is another object of this invention to provide a new and improved electronic game capable of simulating the play of a game of basketball at a sophisticated level.

It is another object of this invention to provide an electronic basketball game operable at different levels of sophistication.

SUMMARY OF THE INVENTION

The foregoing and other objects of the invention are accomplished by a portable electronic basketball game which has an exterior housing mounting a display upon which indications representing the various players, the ball, and the results are presented. The housing also mounts input keys for controlling the operation of the game and contains electronic data processing circuitry organized to provide the automatic play of a number of different skill levels of basketball.

Two offensive players, five defensive players, and a ball are represented on the display. The offensive player having the ball (the handler) is controlled by the operator to move with the ball and to direct passes to the other offensive player (the receiver) which is moved automatically by the data processing circuitry. The handler may also shoot at the basket under control of the operator. The defensive players reach automatically under control of the data processing circuitry as would human defenders under like circumstances to provide zone, man-to-man, and pressing defenses selectable by the operator. The preferred embodiment of the game features a twenty-four second clock, a three-second clock, foul shots, and three-point field goals.

Other objects, features, and advantages of the invention will become apparent by reference to the specification taken in conjunction with the drawings in which like elements are referred to by like reference designations throughout the several views.

BRIEF DESCRIPTION OF THE DRAWINGS

FIG. 1 is a perspective view of the exterior housing of an electronic basketball game constructed in accordance with the invention;

FIG. 2(a)–2(p) illustrates different arrangements of a display of the game illustrated in FIG. 1;

FIG. 3 is a schematic diagram of circuitry utilized in a preferred embodiment of the invention.

DESCRIPTION OF THE PREFERRED EMBODIMENT

Figure 4:
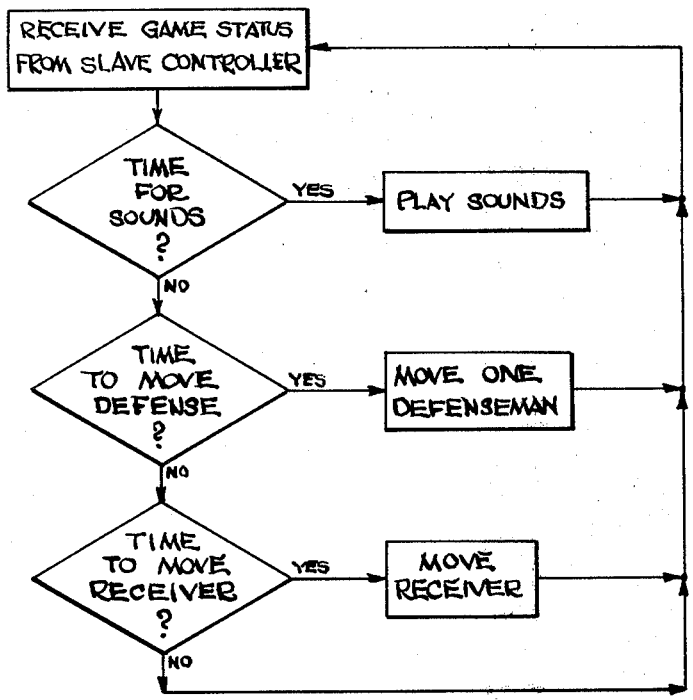
FIGS. 4–13 are flow charts showing the program and operation of a preferred embodiment of the invention.

Referring now to the drawings, and more particularly, to FIG. 1, there is shown a perspective view of an electronic basketball game 10 constructed in accordance with this invention. The game 10 includes an upper housing 12 and a lower housing 14 each of which may be constructed of a moldable plastic material. The housings 12 and 14 may be joined together in a conventional manner to form a hollow interior for containing electronic components. The upper housing 12 mounts a control panel 16 which includes a display 18, a speaker 19, and keys 20 through 29. The key 20 is designated "Off- 1 Pro 2;" the key 21, "Press;" the key 22, "Zone;" the key 23 "Man," the key 24, "Pass;" the key 25, "Shoot;" the key 26, "Up;" the key 27, "Left;" the key 28, "Down;" and the key 29, "Right." On the bottom of lower housing 14, but not shown in FIG. 1, is a door for providing access for insertion of conventional batteries, such as a nine volt transistor battery, to operate the circuitry contained within the housing halves 12 and 14 of the game 10.

In the play of the game there are shown on the display 18 two offensive players (designated handler H and receiver R hereinafter), five defensive players (designated D0–D4 hereinafter) and a ball (designated B hereinafter). The movements of the players and the ball are controlled by use of the keys 20 through 29.

The key 20 is used for switching the game 10 on at either of the two skill levels, Pro 1 or Pro 2. In the Pro 1 skill level, play by the defense proceeds automatically at a first rate of speed. In the Pro 2 position of the key 20, play of the defensive men moves at a faster rate of speed thereby substantially increasing the difficulty and excitement of the game 10. Two faster speeds for the defense are also possible as will be explained below. Each defenseman is indicated on the display 18 by a dimly lit (in relation to the offense) light emitting diode in the preferred embodiment.

The keys 21, 22, and 23 are used for causing the defensemen to play in three defensive styles. When the press key 21 is depressed four of the defensemen try to surround the handler while the remaining defenseman tries to position itself between the ball handler and the pass receiver.

When zone key 22 is depressed, a defense is set up in which each of the five defensemen is restricted to its own zone of play. These zones are shown in FIGS. 2(a)-2(d). In FIG. 2(a), for example, the defenseman designated D0 may move in any of the squares indicated by the cross hatching. The defensemen move in the zone defense to follow one of three strategies depending on how close the handler is to the basket. If the ball handler is in the zone designated as green in FIG. 2(e), the defensemen move at random within their zones. If the ball handler is within the zone designated as yellow in FIG. 2(e), the defenseman attempts to move in the zones to be between the ball and the basket. If the ball handler is in the red zone (referred to as the key) shown in FIG. 2(e), the defensemen attempt to block a shot by heading in the zones directly for the basket.

The depression of the man key 23 causes the defense to move in a manner in which two of the defensemen D0 and D1 attempt to achieve positions between the ball handler and the basket and the other three defensemen stay in zone formations and tend to move to follow the ball. The zone formations for defensemen D2-D4 are shown in FIGS. 2(f) and 2(g). The man key 23 may also be depressed when moving the key 20 to the Pro 1 and Pro 2 positions to obtain third and fourth speeds for movement of the defensemen D0-D4.

The offense consists of the handler H and the receiver R. The handler H is normally indicated by a brightly lit LED on the display 18, and the receiver R is normally indicated by a bright but blinking LED on the display 18. If the ball B separates from the handler H, the LED indicating the handler H also blinks. The handler H is maneuvered about the various positions on the court by depression of the keys 26 through 29. Depression of any key 26 through 29 causes the handler H to move one space in the direction indicated by the key. Depression of two adjacent keys 26-29 causes the handler H to move one space on a diagonal between the direction indicated by the two keys. The key 28 is also used to cause the score of the teams and the time remaining in play to be displayed when the ball is not in play.

The receiver R moves under control of the control circuitry of the game 10 in accordance with the position at which the handler H appears on the display 18. FIGS. 2(h) through 2(m) illustrates positions in which the receiver R moves when the handler H is in any of the positions shown in FIG. 2(n). For example, when the ball handler H is in any of the positions designated four in FIG. 2(n), the receiver R moves through the positions shown in FIG. 2(l). When the handler H is in any of the other positions zero through five shown in FIG. 2(n), the receiver R moves as is shown in the others of FIGS. 2(h)-2(m).

Depression of the pass key 24 causes the control circuitry of the game 10 to direct the ball B in the general direction of the receiver R which then seeks the ball B by trying to move into its path. If the receiver R moves into the path of the ball B, it receives the ball B and becomes the handler H controlled by the keys 26 through 29. In such case, the old handler H becomes the receiver R and begins to blink.

Depression of the shoot key 25 causes the control circuitry of the game 10 to separate the indication of the ball B from the handler H and causes the ball B to proceed toward the basket. A basket is scored by a ball B reaching the position of the basket (row four, column three) after traveling a horizontal, vertical, or diagonal path from the handler H. If a defender D0-D4 is in the path of the shot, the ball B bounces off of it and is taken over by the first player to reach the position of the ball B. If a defenseman is in the path of a pass, it intercepts the ball B except that a defenseman immediately adjacent the handler H does not intercept the ball B. That is, the handler H may pass over a defender immediately adjacent him and complete a pass to the receiver R. The defenseman which intercepts the ball B becomes the new handler H, and a new out-of-bounds formation (See FIG. 2(o)) is then set up.

The display 18 in the preferred embodiment is a five by seven array of horizontally positioned light emitting diodes (LEDs). For convenience, the rows of LEDs are labeled starting at the bottom in FIG. 2 from zero through four, and the columns starting at the left from zero through six. An extra LED 32 is used to indicate a basket positioned centrally above the matrix display. Two seven segment LED digits 34 and 36 are used on opposite sides of the basket to show the score and time remaining.

A game consists of four quarters each lasting twelve simulated minutes. In the preferred embodiment, the visiting team has the ball B at the start of the first and third quarters while the home team has the ball at the start of the second and fourth quarters. The visitors line up to start play in the formation shown in FIG. 2(o) with the handler H at the center and the receiver R at the left in row zero. The home team lines up in the same initial positions with the receiver R to the right, however. If the score is tied at the end of any overtime period, additional overtime periods are played until a winner emerges.

The team remains on offense until the twenty-four second clock has counted down to zero, the three-second clock has counted to zero with the handler H in the key, a shot has been taken and missed and the defense has recovered the ball B, or a shot has been taken and scored. At this point, the team previously on defense goes on offense (taking the original out-of-bounds formation). Before play starts, however, one of the three defensive formation keys 21-23 must be depressed to establish the defense. The new handler H is then controlled by the depression of keys 26 through 29 until, in like manner, the ball B is turned over to the team on defense. The twenty-four second clock is reset every time a shot is attempted. After each turnover, the visitor's score, the home score, and the time remaining are displayed. The ball may also be turned over if it is shot or passed out of bounds or if a quarter ends.

Each time a shot is taken the control circuitry of the game 10 determines on a random basis whether the handler H has been fouled. The closer the handler H is to the basket, the more likely it is that a foul has taken place. When a foul is determined to have occurred, a foul sound is given and the ball continues on its way. If the shot is missed, the offense gets two free throws. If the shot is made and the shooter is fouled, the shooter is awarded one free throw. In another embodiment, if the shot is missed, the offense receives up to three chances to make two successful throws if the opponent's defense has committed more than four fouls during the present period of play. If a free throw is required, the teams arrange themselves in the free throw formation shown in FIG. 2(p) with the receiver R lined up on the same side of the key which it takes on an out-of-bounds play.

A free throw is taken by the operator pressing the shoot key 25 when the teams are in the free throw formation which is automatically set up by the control circuitry. In the preferred embodiment, the shot goes in or not depending on a random probability generated by the control circuitry of the game 10. If a last free throw misses, the missed shot rebounds off the basket, becomes live, and may be picked up by either team.

If a shot is taken and scored and the ball is shot from the green zone shown in FIG. 2(e) and a basket is made, three points are awarded to the offensive team for a three point field goal. The preferred embodiment uses a line on the display 18 to illustrate the range for a three point field goal. Any other basket is worth two points except foul shots which are each worth a single point.

Referring now to FIG. 3 there is shown a block diagram of the circuit of the invention. The game 10 shown in FIG. 3 includes the input keys or switches 20-29. Each of the switches 21-29 is shown as a normally open switch which upon depression of a button closes a current path thereacross. The switch 20 is shown as a three-position, two-pole, make-before-break, slide switch.

Power is furnished to the game 10 from a source of DC power 50 which is connected to the switch 20 in parallel with an AC jack 52 (which allows house current to be applied through a transformer not shown) across a capacitor 54 through a diode 55. The switch 20 connects to a first controller 56 at terminals VDD and VSS. The switch 20 also allows the keys 21-23 (which select the form of defense) to be connected into circuitry leading to an input terminal $IN_3$ in the $P_2$ position of the switch 20 and to be disconnected in the other positions of the switch 20.

As will be understood by those skilled in the art, the controller 56 (and a controller 58 to be discussed hereinafter) may be implemented in any of a number of different ways. However, as with many prior art electronic game circuits, the preferred embodiment of the invention utilizes an integrated circuit microprocessor (a miniature digital electronic computer). Such integrated circuit microprocessors are well known and include all of the input, output, memory, logic, and control circuitry of a special purpose digital computer in miniature form. In general, such circuits have both random access memory (RAM memory) and read only memory (ROM memory). The ROM memory has connections formed by masking operations during the construction of the basic circuitry of the controller 56 to provide a completely wired circuit which includes the program for controlling the operation of the microprocessor. Such an arrangement is often described as a dedicated memory circuit. The RAM memory of the circuit is utilized for storage of the various transient bits of information and program during the operation of the circuitry.

Although many electronic games known to the prior art utilize circuitry on a single chip, the present invention utilizes two essentially identical controllers 56 and 58 which are individually masked in such a way as to provide a substantial increase in the memory capability of the game 10 over those of the prior art so that more sophisticated operations may be accomplished. The controller 56 is designated, for convenience, the slave controller and the controller 58 is designated the master controller because the control of communication between the controllers 56 and 58 resides in the controller 58.

Various controller circuits are offered by a number of manufacturers and are well known to the prior art. A preferred embodiment of the present invention uses two COP 420L Microcontrollers manufactured by National Semiconductor. The circuit is better described in the *COPs Chip User's Manual* published by National Semiconductor.

As may be seen in FIG. 3, the closure of the various keys 21-29 provides input signals at terminals $IN_0 19$, $IN_1 9$, $IN_2 10$, and $IN_3 20$ of the slave controller 56. A closure of the keys 21-29 also provides connections to the display 18 which, as shown in FIG. 3, comprise a number of LEDs 30 and 32 and the LED digits 34 and 36 connected in the arrangement above described. Input signals to the display 18 from the controller 56 are furnished at terminals D0-D3 and G0-G3. Communication with controller 58 is provided at terminals L0-L7. Reset pulses are provided at a reset terminal on controller 56 by reset circuitry including a diode 60 connected in parallel with a resistor 62 and to a capacitor 64. The reset circuitry is connected to the terminals VSS and VDD in order to supply power for its operation. Timing pulses are provided to the controller 56 at a terminal CKI by a clock control circuit 66.

The master controller 58 provides output signals at a terminal $G_1$ for operating a piezoelectric speaker 70 and at terminals L0-L7 for communication with controller 56. Timing pulses for the master controller 58 are provided at a terminal CK1 from the circuit 66. The controller 58 is also connected to the source 50 at its terminals VDD and VSS in a manner identical to the chip 56. The controller 58 receives reset pulses from reset circuitry including the diode 60 at its reset input terminal.

FIG. 4 describes the overall operation of a preferred embodiment of master controller 58 described above.

As may be seen in FIG. 4, the master controller 58 receives information regarding the game status from the slave controller 56 and moves to a decision step in which it is determined whether and what sounds the game 10 is to produce. If sounds are to be produced, the program moves to a step in which the sounds are generated by controller 58 and played by means of the speaker 19. The program then recirculates to the step in which it awaits the receipt of the game status from the slave controller 56. The sound effects are generated on the occurrence of certain situations in a game play and are listed below:

One Whistle—Personal foul committed by the defense.
Two Whistles—Blocked shot or pass, ball out of bounds, or over twenty-four seconds without a shot all of which caused a turnover.
Three Whistles—Handler has spent too much time in the key causing a turnover.
Two-note Fanfare—Free throw was good.
Four-note Fanfare—Field goal was good.
Double Fanfare—Three point field goal scored.
Buzzer—End of each of the first three quarters.
Two Buzzers—End of overtime period.
Long Buzzer—End of the game.

If no sounds are to be produced after the receipt of the game status, the program moves to a decision step in which it is determined whether it is time to move a defenseman. If it is time to move a defenseman, the program moves to a sub-routine in which the particular defenseman to be moved and the particular move that that defenseman shall make are determined. The program then recirculates to receive the game status from the slave controller 56. If it is not time to move the defense, the program moves to a decision step in which it determines whether it is time to move the receiver R. If it is time to move the receiver R, the program moves to a step in which the particular move the receiver R is to make is computed and the receiver R is moved. The program then recirculates to the step in which the game status is received from the slave controller 56. If it is not time to move the offensive receiver R, the program recirculates directly to the step at which it receives the game status from the slave controller 56.

Figure 5:
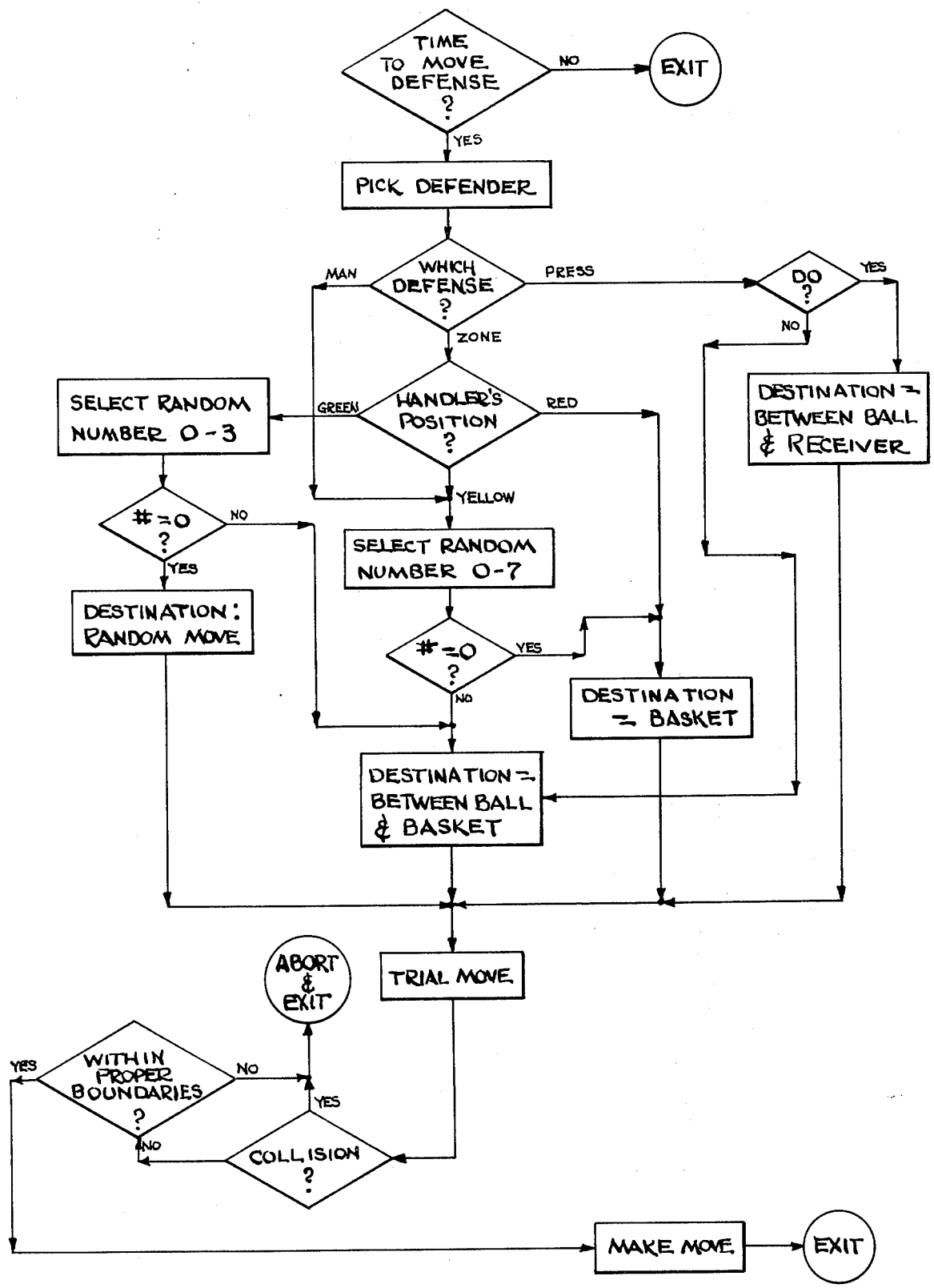

FIG. 5 illustrates the steps taken in the preferred embodiment in the sub-routine which implements the step of moving a defenseman in FIG. 4. As may be seen in FIG. 5, the program moves from the step in which the determination as to whether it is time to move a defenseman is accomplished to a step in which one of the defenders is picked at random. Since there are five defenders used in playing the game 10, the probability of any particular defender being picked is one in five.

The program then moves to a decision step from which a path is selected depending on whether the keys 21, 22, or 23 have been pressed. If key 21 has been depressed, the defensman should move in a pressing defense; and the program moves to a decision step in which it is determined whether the particular defender selected at random to make the move is defender D0. As will be recalled, in the pressing defense four defenders surround the handler while a single defender attempts to position itself between the handler H and the receiver R.

In a preferred embodiment, the defender D0 is the defender selected to position itself between the handler H and the receiver R. Consequently, if the defender picked at random is the defender D0, the program moves to a step in which its destination is selected as the mid point between the ball B and the receiver R. The program then moves to a step in which a trial move of the defender D0 closer to the chosen destination is made. After the trial move, the program moves to a decision step in which it is determined whether a collision would take place were the defender D0 to move to the trial position. If such a collision would occur, the move is cancelled; and no move of the defense takes place.

If no collision would occur, the program moves to a decision step in which it is determined whether the move is within the proper boundaries. With a pressing defense, the move will be within the proper boundaries in all cases, for there are no specific zones set up in which a defender is constrained to move in the pressing defense. Consequently, the program will move to a step in which the move is executed and, thereafter, will exit the sub-routine from moving the defense.

In executing the pressing defense, if it is determined that the particular defender randomly selected is not defender D0, then the program moves to a step where a destination for the defender mid way between the ball B and the basket is selected. The program then attempts a trial move of the defender and determines whether a collision will occur. If a collision will occur with any of the defenders, the move is not taken on the particular circulation of the program. If no collision will occur, the program moves to the decision step in which it is determined whether the new move is within the proper boundaries, to make the move, and to exit the sub-routine.

If the defense selected is the zone defense initiated by depressing the zone key 22, the program moves to a decision step in which the position of the handler H is determined. FIG. 2(e) illustrates three areas in which the handler H may be positioned which will cause different operations by the zone defense. These are the green, yellow, and red zones illustrated in FIG. 2(e).

If the handler is positioned within the green zone shown in FIG. 2(e), the program branches to a step in which a random number between zero and three is selected and then to a decision step in which it is determined whether the random number selected is zero. If the random number is not zero (that is, in three out of four cases), the program moves to select the destination for the particular defender randomly chosen as the mid point between the ball and the basket. The program then moves to the step in which a trial move of the particular defender is attempted and to the decision step where it is determined whether a collision will take place or not. Presuming that no collision will take place, the program moves to determine whether the particular move selected is within the proper boundaries.

As may be seen from FIGS. 2(a)-2(d), each defender D0-D4 may move only in particular spaces in a zone defense. Thus, if the particular move selected is outside of the spaces to which that defender is limited in the zone defense, the program moves to abort the move selected and to exit the sub-routine. If the new move is within the proper boundaries, the program then makes the move and exits the sub-routine.

If the random number selected in setting up the zone defense when the handler H is in the green zone is zero, the program moves to a step at which the destination chosen for the selected defender is a random move one space from the present position of the particular defender. The program then moves to attempt a trial move of the defender and through the remainder of the sub-routine. Thus the defender in moving in a zone defense where the handler H is in the green zone will usually move to a mid point between the ball and the basket, but in approximately one out of four cases will move randomly one space from its present position.

When the zone defense is being played and the handler H is in the yellow zone shown in FIG. 2(e), the program moves to select a random number between zero and seven. The program then moves to determine whether the number selected was zero. If the number selected is zero (in one out of eight cases), the program moves to set the destination for that defender as the basket and to move through the remainder of the sub-routine. If the random number selected is not zero (in seven out of eight cases), the program moves to set the destination of the particular defender selected for the move on this circulation of the program as the mid point between the ball B and the basket.

The program then moves to attempt a trial move, to determine whether a collision will take place, whether the move is within the proper boundaries for a particular man in a zone defense, to make the move, and to finally exit the sub-routine. Thus, where the handler H is positioned in the yellow zone of play shown in FIG. 2(e), the selected defenseman, in seven out of eight cases, moves to a mid point between the ball B and the basket and in the other case moves for the basket to block a shot.

If the handler H is positioned in the red zone shown in FIG. 2(e) and the defense is a zone defense, the program moves to a step to set the destination for the selected defender as the basket thereby attempting to create a ring of players impeding the movement of the ball B to the basket. As with the other defense setups, the program then moves to attempt a trial move of the defender to determine whether a collision will occur, to determine whether the new move is within the proper boundaries, and to make the proper move.

Figure 6:
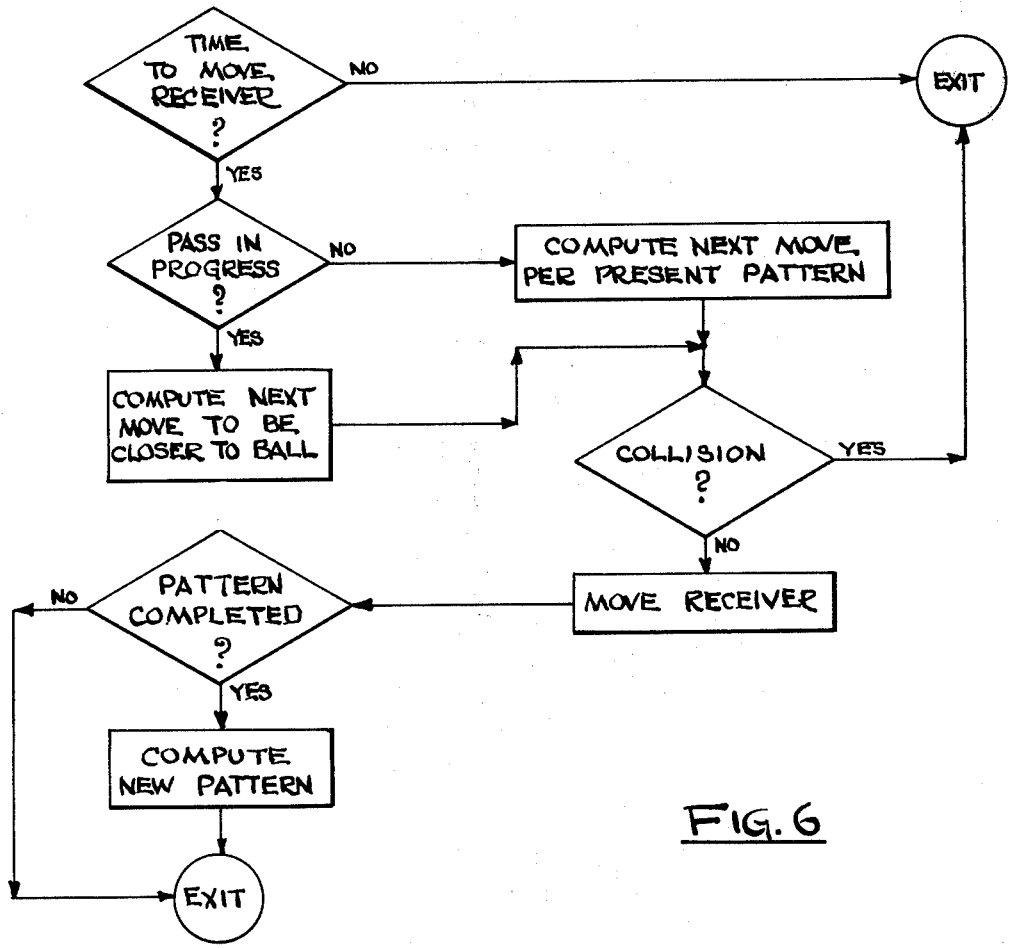

FIG. 6 illustrates the steps of a sub-routine of the preferred embodiment of the program for moving the receiver R. This sub-routine may be used to implement the Move Receiver step shown in FIG. 4. After determining that it is time to move the receiver R (as shown in FIG. 4), the program moves to a decision step at which it is determined whether there is presently in progress a pass from the handler H to the receiver R. If no pass is in progress, the program moves to a step in which the controller 58 computes the next position of receiver R according to the present pattern of the players on display 18.

It will be recalled that when the handler H is in positions numbered zero through five in FIG. 2(n), the receiver R moves as shown in the patterns associated with the numbers zero through five in FIGS. 2(h)-2(m). For example, if the handler H is in one of the positions numbered five in FIG. 2(n), the receiver R moves as shown by the arrows in FIG. 2(m). Once the receiver R has begun such a pattern, it continues one complete cycle; then the controller 58 looks at the new position of the handler H and starts the receiver R running a new pattern. Thus, the next position for the receiver R is normally the next position in the pattern presently being run.

The program then moves to a decision step at which it is determined whether a move to the selected position for the receiver R will result in a collision with another player. If a collision will result, the program moves to exit the sub-routine. If a collision will result, the receiver R is moved and the program moves to a decision step to determine whether the present movement pattern has been completed. If it has not, the program exits the sub-routine. If the pattern has been completed, then the program moves to compute a new pattern for movement of the receiver R as explained above.

If a pass is in progress between the handler H and the receiver R when it is time to move the receiver R, the program moves to compute the next move for the receiver R to place the receiver R closer to the ball B so that the ball B may be received. The program then moves to the step to determine whether in the new position a collision will result, to make the move if no collision would result, to determine whether the pattern of movement for the receiver R has been completed, to compute a new pattern if it has been completed, and to exit the program (all as explained above).

Figure 7:
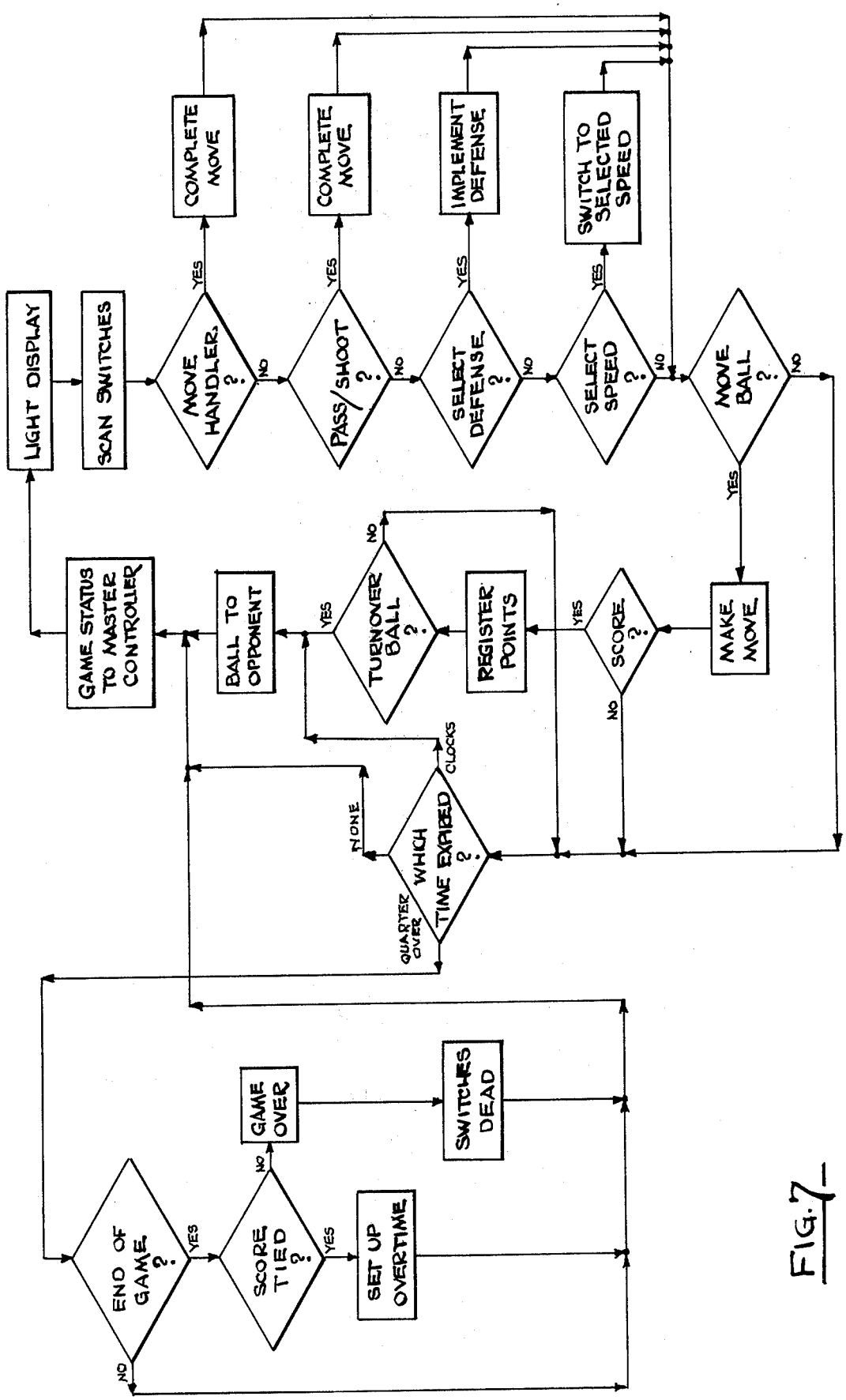

FIG. 7 illustrates the steps of the program in the operation of the slave controller 56 in the preferred embodiment of the invention. FIG. 7 begins with a step in which the various positions representing players on the display 18 are illuminated. The particular positions of the display 18 are more fully illustrated in FIG. 3 in which are shown a series of LEDs 30 arranged in columns from zero at the left through six and rows from zero at the bottom through four. Any particular LED 30 is illuminated by energization of a conductor in a row and a conductor in a column leading to the particular LED 30 at the intersection of the two conductors. As explained above, the handler H is usually shown by a brightly lit LED, the receiver R by a brightly lit but flashing LED, the defensemen by dimly lit LEDs, and the ball B by a brightly lit LED when separated from the handler H.

The program moves from the step in which the positions of the players on the display 18 are illuminated to a step in which the input switches 20-29 are scanned to determine which, if any, have been actuated. The program then moves through a series of decision steps to determine whether any particular actions are necessary because of switch closures. The program first determines whether the handler H is to be moved and then completes the move. If the handler is not to move, the program determines whether a shot or a pass has been taken and executes the action. If a shot or pass has not been taken, the program determine whether a defense has been keyed in and executes the defense. If a defense has not been selected, the program determines whether a speed change has occurred (the key 20 may be moved from position 1 to position 2 at any turnover) and implements the new speed.

From completing any of these steps or if no action is necessary, the program moves to a decision step in which it is determined whether to move the ball B or not. If the ball should not be moved, the program advances to a step to accomplish various timing and clock functions including determining whether the twenty-four second clock has expired, the handler H has been in the key for more than three seconds, or a quarter has elapsed. If the twenty-four second clock has expired or a three-second violation has occurred, the program moves to turn over the ball to the opponent. If the end of a quarter has occurred, the program moves to a decision step to determine whether the end of the game has occurred. If neither the end of the quarter, the expiration of the twenty-four second clock, nor a three-second violation has occurred, the program moves to a step at which the game status is sent to the master controller 58.

If the end of the game has occurred, the program moves to a decision step at which it is determined whether the score is tied so that an overtime is necessary. If the score is not tied, the program moves to a step to indicate that the game is over, to a step to deactivate the switches 21-29, and on to the step in which the game status is sent to the master controller 58. If the score is tied at the end of the game, the program moves to a step to provide a five minute overtime, then to the step to send the status of the game to the master controller 58.

If the ball B needs to be moved at the Move Ball step, the program moves to a step in which the ball is moved and then to a decision step to determine whether a score has occurred. If no score has occurred, the program moves to the step at which the timing and clock functions are taken care of and then to the remainder of the program as explained above. If a score has been made, the program moves to a first step to register the points and then to a decision step to determine whether a turnover of the ball B has occurred. If no turnover of the ball B has occurred, the program moves to the step for implementing the timing and clock functions and continues through the program as explained above.

If a turnover of the ball takes place after a score as on a field goal without a foul or on a last foul shot, the ball moves to set up a new initial formation in which the ball is given to the opponent. As explained above, FIG. 2(o) illustrates this initial formation for the visiting team on offense. The program then moves to the step in which the game status is relayed to the master controller 58 and from that step recycles to the step for illuminating the various display positions (as explained above).

Figure 8:
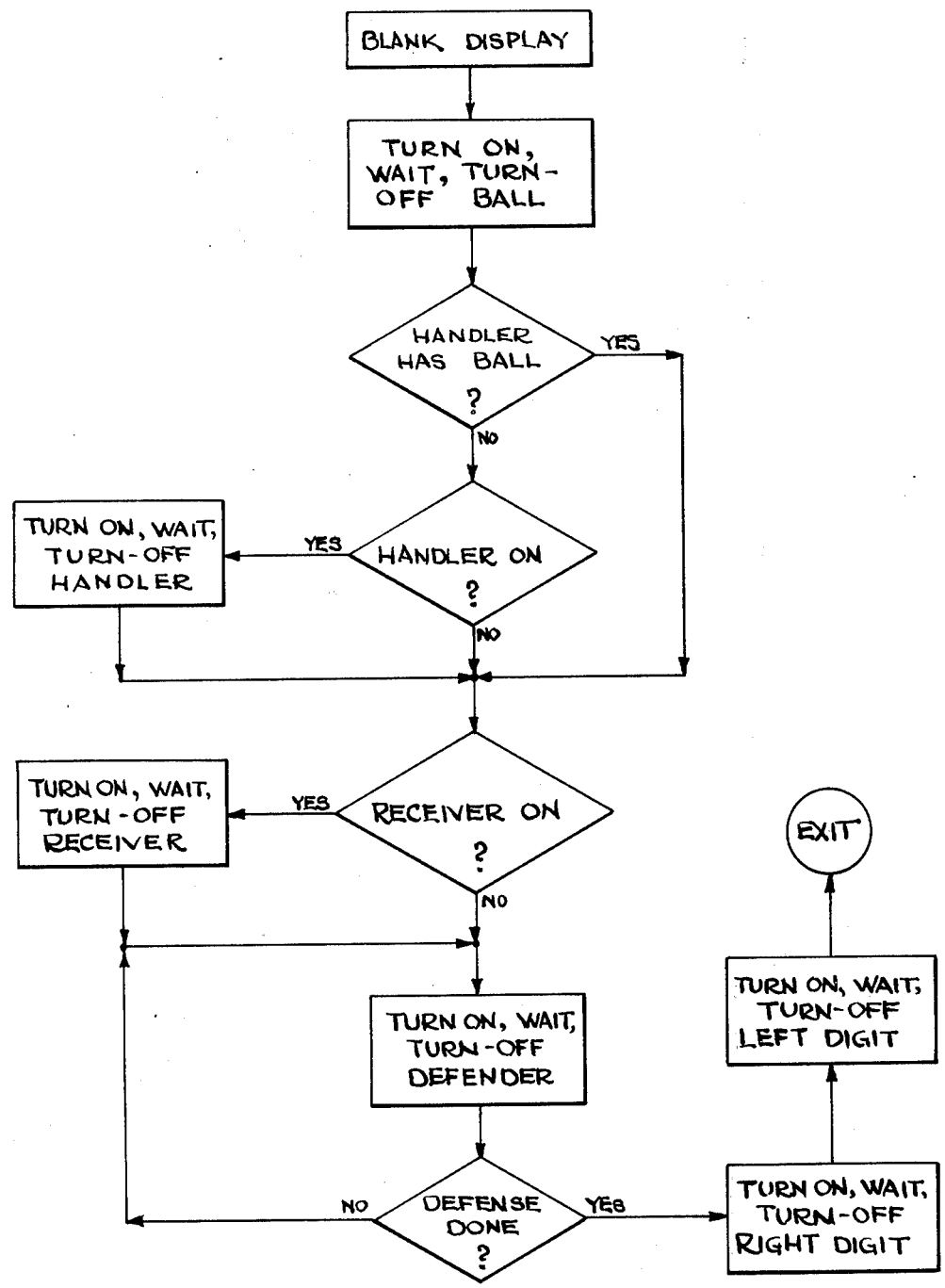

FIG. 8 illustrates the sub-routine illustrated in the preferred embodiment for lighting up the display, the first step shown in FIG. 7. The first step in the program of FIG. 8 is to blank out all of the LEDs of the display 18. The program than proceeds to a step at which the LED 30 which is at the present position of the ball B is first switched on for a short period then off. The period of time during which any LED 30 representing the ball B or a player remains on is, with the repetition of the illumination cycle, sufficient that the image of the ball B appears to persist on the display 18.

The program next moves to a decision step at which it is determined whether the handler H has possession of the ball B. If the handler H does not have possession of the ball at this step, the handler H must be individually lit; and the program moves to an additional decision step where it is determined whether the handler H illumination on display 18 is on or off. The handler H blinks when the ball B is not held; consequently, the LED 30 representing the handler H is not illuminated on each cycle of the program. If the LED 30 which represents the handler H should be on, then the program moves to turn on the LED 30 which represents the handler H, to wait a particular interval with that LED 30 on, and finally to turn off the LED 30 representing the ball handler H.

The program then moves to a step to determine whether the pass receiver should be on or off. If the ball handler H should not have been on at last mentioned decision step or if the handler H has possession of the ball B, the program moves immediately to determine whether the receiver R should be illuminated or not. The receiver R blinks at all times so, like the handler H, is not illuminated on each cycle.

If the receiver should be illuminated at the particular cycle, the program moves to turn on the LED 30 which represents the receiver R, to wait a designated interval, and then to turn off the LED 30 representing the receiver R. The program then moves to a series of step at which each of the defensemen D0-D4 is turned on one at a time. In accomplishing this step, the program moves to turn on an LED 30 representing the present position of a first defenseman, to wait an interval, and finally to turn off the particular LED 30 representing the particular defenseman. The program then moves to a decision step to determine whether all defensemen have been illuminated on the display 18. If they have not, the program recirculates to turn on the remaining defensemen and, ultimately, exits the decision step when all of the defensemen have been illuminated.

The program next moves to illuminate the digit 34 of display 18, to wait an appropriate interval, and finally to turn off the LEDs of digit 34. The program then moves to turn on the LEDs of digit 36, to wait an appropriate interval, and finally to turn off the LEDs of digit 36. Finally the program exits the light display step of FIG. 7.

Figure 9:
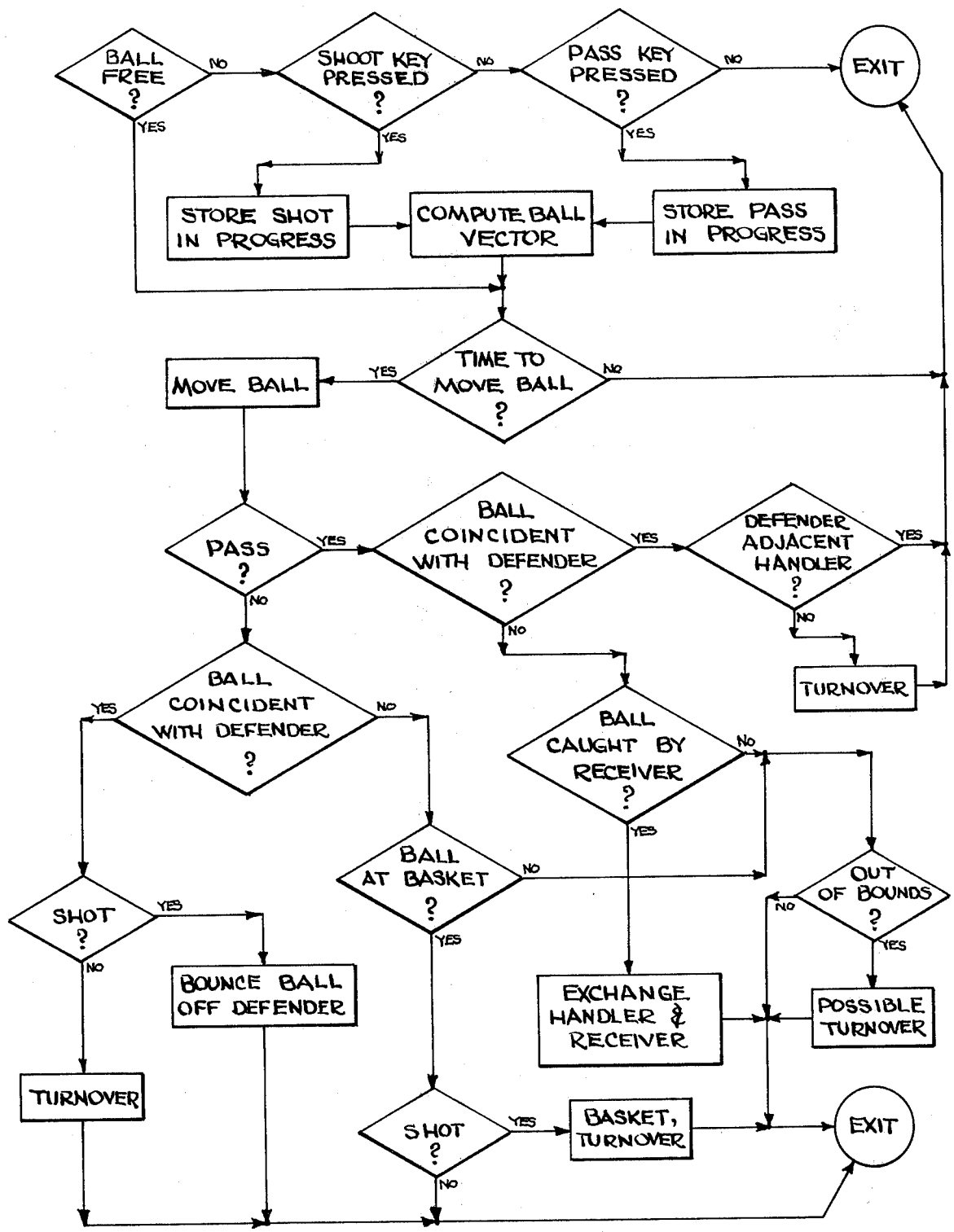

FIG. 9 is a sub-routine for the Move Ball step of FIG. 7 for the preferred embodiment of the invention. The first step illustrated in FIG. 9 is a decision step in which it is determined whether the ball B is free of handler H or not. If the ball B is free, the program moves directly to a decision step at which it is determined whether it is time to move the ball B or not. If the ball B is not free, the program moves to a decision step where it is determined whether the shoot key 25 has been depressed or not. If it has not been depressed, the program moves to determine whether the pass key 24 has been depressed or not. If neither key 24 nor 25 has been depressed, the program moves to exit the sub-routine.

If the shoot key 25 or the pass key 24 has been depressed, the program moves to store the fact either that a shot is in progress or that a pass is in progress and the moves to a step at which the vector of the ball B is computed. The ball can travel in any of eight directions up, down, to the right, to the left, and on any forty-five degree diagonal between these directions. When the vector has been computed, the program moves to the decision step to determine whether it is time to move the ball B or not.

If it is not time to move the ball B, the program exits the sub-routine. If it is time to move the ball B, the program moves to a step at which the ball B is advanced one space according to the vector determined. The program then moves to a decision step at which it is determined whether the movement is part of a pass or not. In a pass, the ball may be intercepted by a defender in its path while a shot bounces off a defender in its path. Thus, if the movement of the ball B is part of a pass, the program moves to a step to determine whether the ball B is coincident with a defender. If not, the program moves to determine whether the ball B is caught by the receiver R. If the ball B is caught by the receiver R, the receiver R becomes the handler H and the keys 26-29 now control the new handler H (the previous receiver R). The program then moves to exit the sub-routine. If the ball B is not caught by the receiver R, the program moves to a decision step to determine whether the ball B went out of bounds. If the ball B did not go out of bounds, the program moves to implement a turnover and exits the sub-routine.

If on a pass the ball B is coincident with a defender, the program moves to determine whether the defender is adjacent the handler H because the handler H may pass the ball B over a defender immediately adjacent without an interception. Consequently, if the defender is not adjacent the handler H, the program moves to set up a turnover and then exits the sub-routine. If the defender is adjacent to the handler H, then the program exits the sub-routine.

If a pass is not taking place (a shot is occurring or the ball is free), the program moves to determine whether the ball B is coincident with a defender. If the ball B is coincident with a defender, the program moves to determine whether the ball B is being shot and, if it is, to bounce the ball B off the defender as a loose ball. The program then exits the sub-routine. If the ball B is not being shot, the program moves to accomplish a turnover and exits the sub-routine.

If the ball B is not coincident with a defender, the program moves to determine whether the ball B is at the basket. If it is, then the program moves to a decision step to determine if a shot was taken, then to score a basket and establish a turnover if a shot was taken, and exits the sub-routine. The step at which a basket is scored includes determining whether the shot traveled from a position in the green zone shown in FIG. 2(e) and, consequently should be counted as two or three points. If no shot was taken, the program exits the sub-routine. If the ball is not at the basket, the program moves to determine whether the ball is out of bounds and proceeds as explained above.

Figure 10:
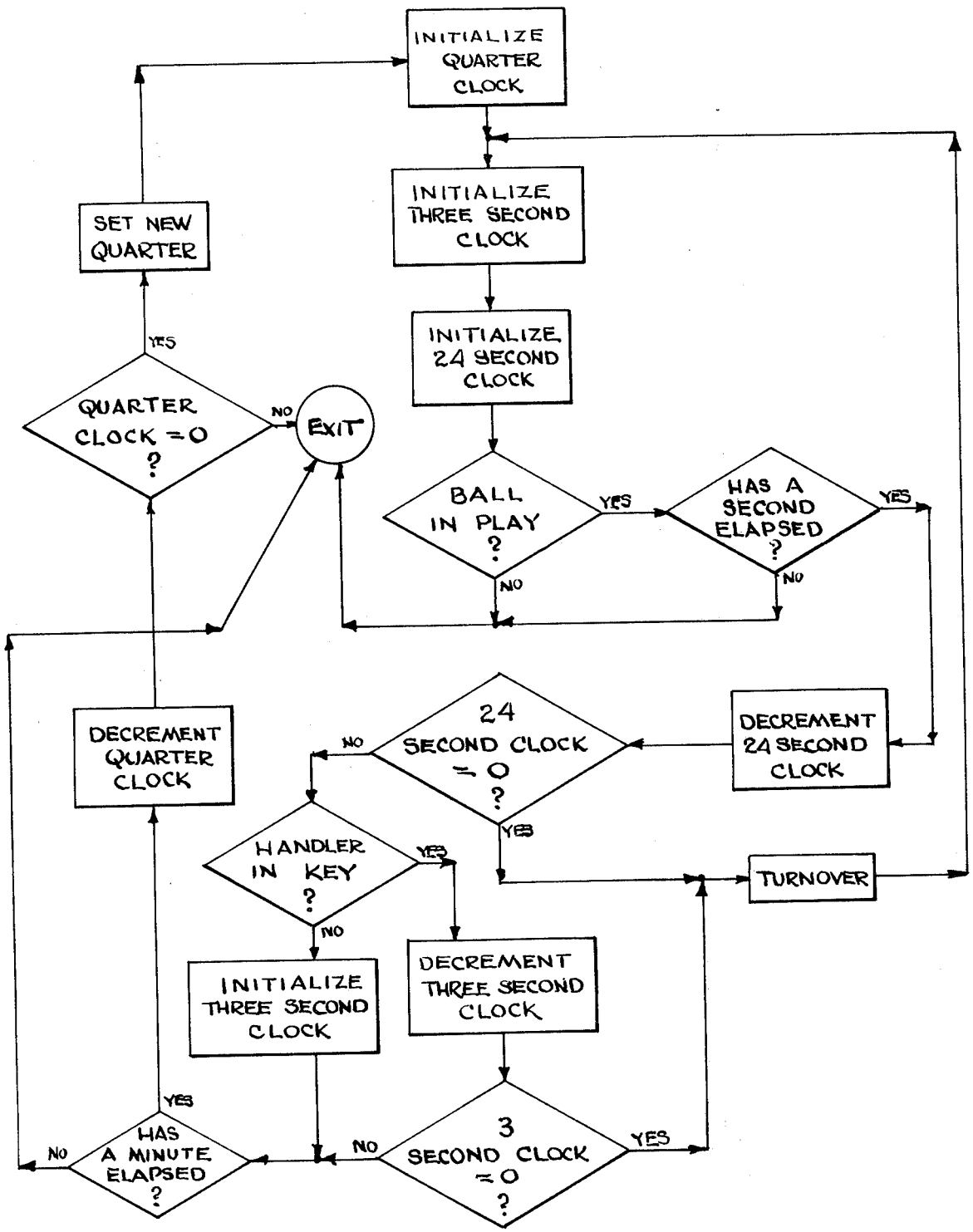

FIG. 10 illustrates a sub-routine utilized in the preferred embodiment of the invention for implementing the Time Expired step shown in FIG. 7. The subroutine is entered at a step at which the clock which measures the length of each simulated quarter of play is initialized to set up a simulated twelve minutes of time. The program then moves to a step in which the three-second clock for measuring the time the handler H remains in the key is initialized. The program then moves to a step to initialize the twenty-four second clock.

After initializing the three clocks, the program moves to a decision step at which it is determined whether the ball B is in play. If the ball B is not in play, the program exists the subroutine. If the ball B is in play, the program moves to a decision step to determine whether a simulated second has elapsed. If such a second has not elapsed, the program exits the sub-routine. If such a second has elapsed, the program moves to a step to decrement the twenty-four second clock by one second.

Thereafter, the program moves to a decision step to determine whether the twenty-four second clock has been decremented to zero. If the clock has been decremented to zero, the program moves to terminate the possession of the offensive team and create a turnover. Thereafter, the program recycles to reset the three-second clock and moves through the remainder of the sub-routine as explained above.

If the twenty-four second clock has not been decremented to zero, the program moves to determine whether the handler H is in the key. If the handler H is in the key, the program moves to decrement the three-second clock and then to a decision step at which it is determined whether the three-second clock has been decremented to zero. If the three-second clock has been decremented to zero, the program moves to end the possession of the offensive team, create a turnover, and recycle as explained above.

If the three-second clock has not been decremented to zero, the program moves to determine whether a minute has elapsed or not. The program also moves to the step at which it is determined whether a minute has elapsed from the step at which it is determined whether the handler H is in the key if it is found that the handler H is not in the key; in this case, the program moves to the "minute passed" decision step after first initializing the three-second clock.

If a minute has elapsed, the program moves to decrement the quarter clock by one minute and then to a decision step to determine whether the quarter clock has been decremented to zero. If the quarter clock has been decremented to zero, the program moves to start the next quarter by setting up an inbounds pass with the appropriate team in control of the offense (as shown in FIG. 2(o)) and then to recycle through the sub-routine starting at the initialize quarter clock step. If a minute has not elapsed or the quarter clock has not been decremented to zero, the program moves to exit the sub-routine.

Figure 11:
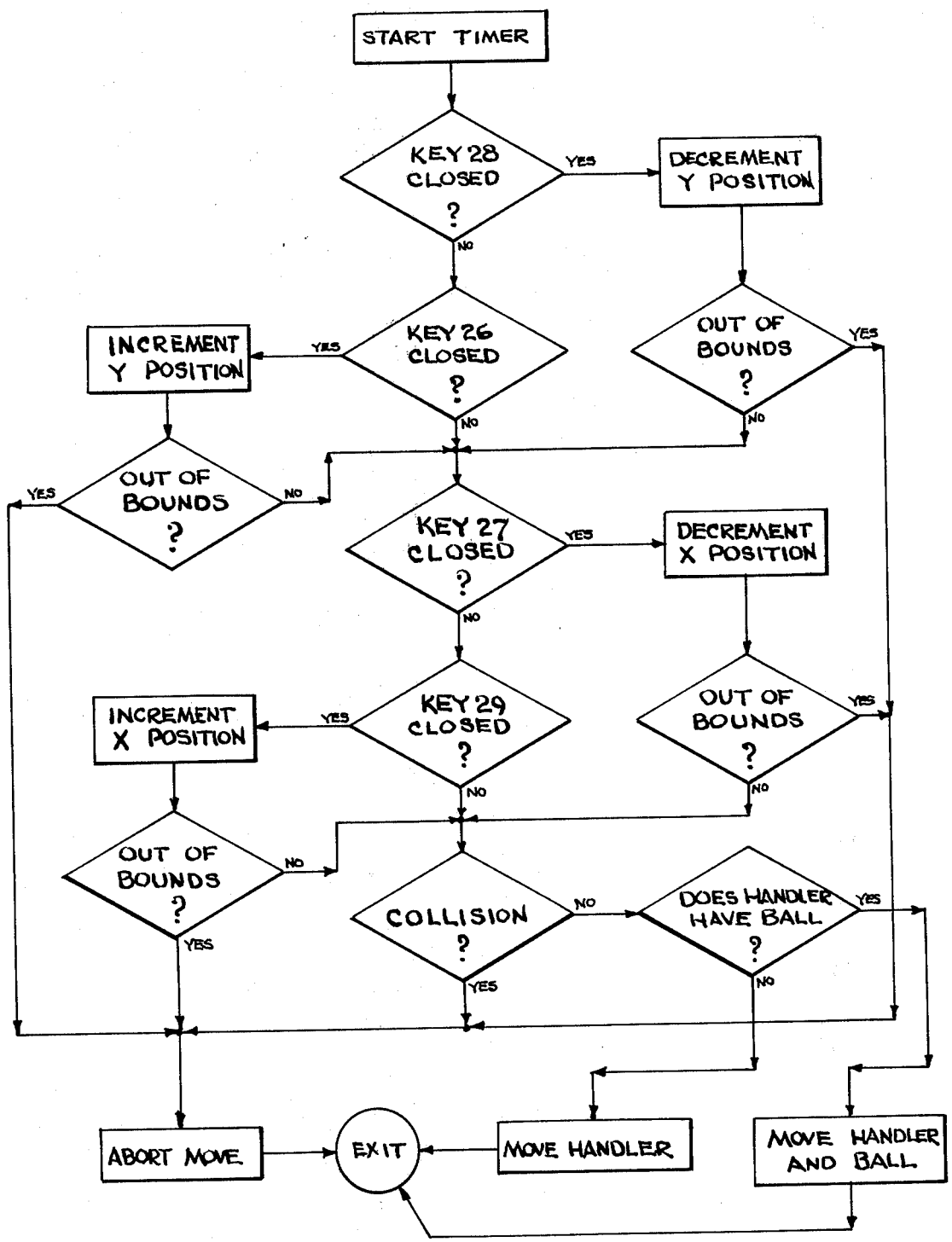

FIG. 11 illustrates the steps of the sub-routine of the preferred embodiment of the invention in executing the Move Handler step of Flow FIG. 7. The sub-routine is entered at a step in which the timing functions are started and moves to a series of four decision steps in which it is determined which, if any, of the switches 26–29 have been activated by depression.

The program first moves to a step in which it is determined whether or not key 28 has been depressed. If key 28 (the "down" key) has been depressed, then the program moves to decrement the Y position of the handler H, that is, to move the handler H down on display 18. The program next moves to a decision step to determine whether such a move would cause the handler H to go out of bounds. If it would cause the handler H to move out of bounds, the program moves to a step to cancel the move and exists the sub-routine. If the move would not cause the handler H to move out of bounds, the program advances to a decision step to determine whether the key 27 has been depressed.

If the down key 28 has not been depressed, the program moves to a step in which it is determined whether the "up" key 26 has been depressed or not. If the key 26 has been depressed, then the program moves to a step in which the handler H is moved up one space and then to a decision step in which this move is tested to see whether the handler H would go out of bounds were the move to be taken. If the handler H would go out of bounds, the program moves to the step in which the move is aborted and the sub-routine is exited.

If the handler H would not go out of bounds in response to depression of the up key 26 or if the key 26 has not been depressed, the program moves to the step in which it is determined whether the "left" key 27 has been depressed. If the key 27 has been depressed, the program moves to decrement the X position of the handler H (that is to move the handler H to the left). The program then moves to test whether such a position, were it to be taken, would cause the handler H to move out of bounds. If the handler H would move out of bounds, the move is aborted and the sub-routine is exited. If the move would not cause the handler H to move out of bounds, the program moves to a step in which it is determined whether a collision would occur or not.

If left key 27 has not been depressed, the program moves to a step in which it is determined whether "right" key 29 has been depressed. If the key 29 has been depressed, the program moves the handler H one position to the right, tests for out of bounds, and aborts the move if it would move the handler H out of bounds. If the move would not move the handler H out of bounds or if key 29 has not been depressed, the program moves to the collision test step.

It should be noted that this sequence of steps testing whether keys 26–29 have been closed is such that on any cycle of the operation a key moving the handler H in the Y direction and a key moving the handler H in the X direction may both be depressed and both cause the movement of the handler H by one space. Consequently, by depression of adjacent pairs of the keys 26–29, the handler H may be made to move on a 45° diagonal between each of the four (up, down, left, right) directions.

After testing for the closure of each of the keys 26–29, the program moves to the decision step in which it is determined whether moving the handler H to the particular position selected would cause a collision with another player. If a collision would be caused, the move is aborted and the sub-routine is exited. If the move of the handler H would not cause a collision, the program moves to a decision step in which it is determine whether the handler H has the ball. If the handler does not have the ball, then the handler without the ball is moved to the new position and the program exits the sub-routine. If the handler H has the ball, the program moves both the handler H and the ball B to the new position and exits the sub-routine.

Figure 12:
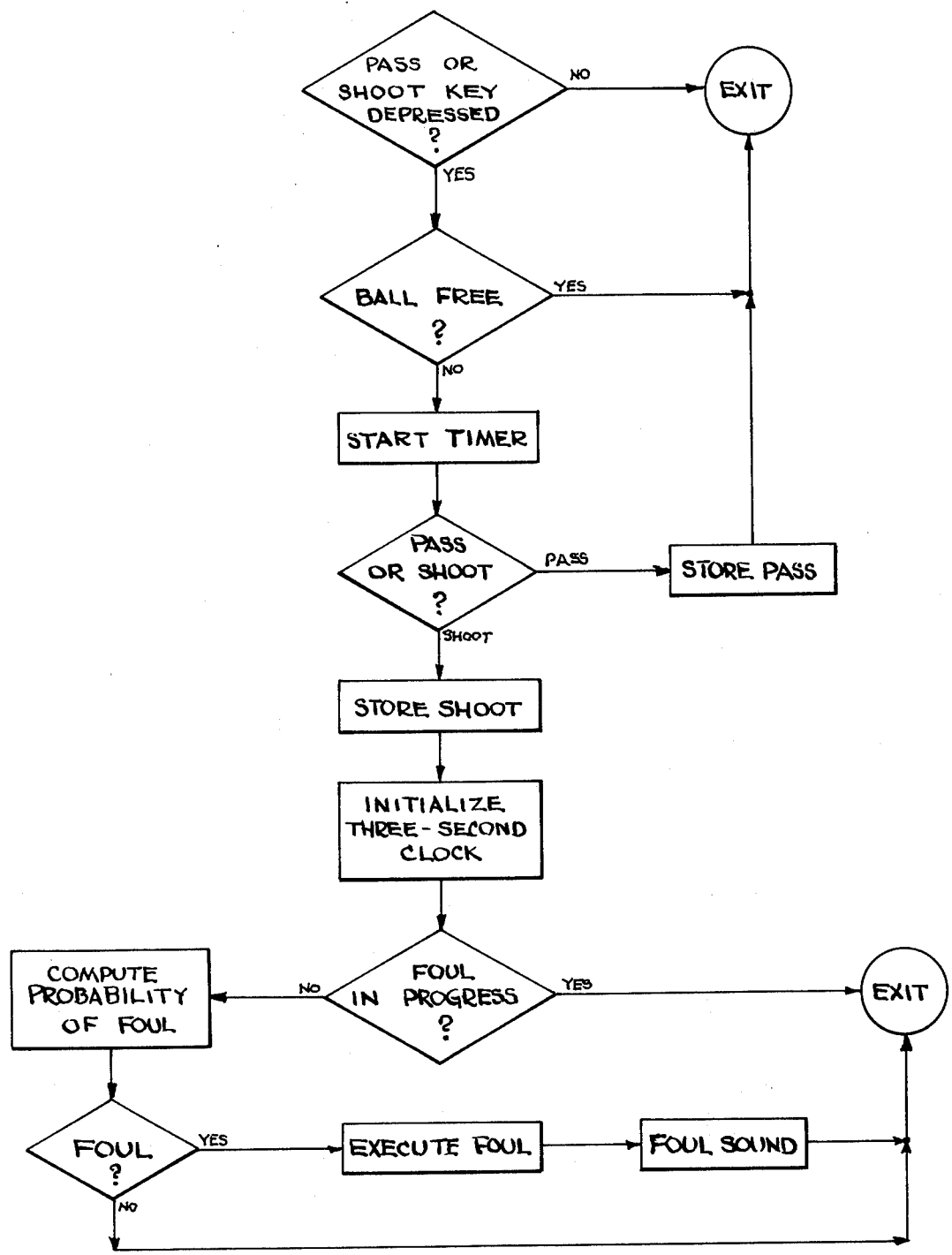

FIG. 12 illustrates a sub-routine used in the preferred embodiment of the invention for implementing the Pass/Shoot step shown in FIG. 7. This sub-routine is entered at a step in which it is determined whether either the pass key 24 or the shoot key 25 has been depressed. If neither have been depressed, the program exits the sub-routine. If either has been depressed, the program moves to a decision step in which it is determined whether the ball B is in play and out of possession of the handler H. If the ball B is in play and out of possession of the handler H, the program exits the sub-routine. If the ball B is not in play or is in possession of the handler H, the program moves to start the various timing functions.

The program next moves to a decision step in which it is determined whether the pass key 24 or the shoot key 25 has been depressed. If the pass key 24 has been depressed, the program moves to store this information and exit the sub-routine. If the shoot key 25 has been depressed, the program moves to store this information and then moves to initialize the three-second clock. The program then moves to a decision step to determine whether a foul is in progress since the handler H may have already been fouled and may be presently taking a foul shot. If a foul shot is in progress, the program exits this sub-routine. If a foul shot is not presently in progress, the program moves to compute the probability of a foul occurring on this shot based on the position of the handler H. In the preferred embodiment of the invention, if the handler H is in the green zone shown in FIG. 2(e), the probability is one in sixteen of a foul being committed on any particular shot. If the handler H is in the yellow zone, the probability is one in eight of a foul being committed; and, if the handler H is in the red zone, the probability is one in four of a foul being committed on any particular shot.

The program next moves to a decision step at which it is determined whether, based on the probability of a foul having been committed, one has occurred. If no foul has occurred, the program exits the sub-routine. If a foul has occurred, the program stores this information in memory and moves to a step at which the speaker 19 is caused to emit the "foul" sound. The program then moves to exit the sub-routine.

Figure 13:
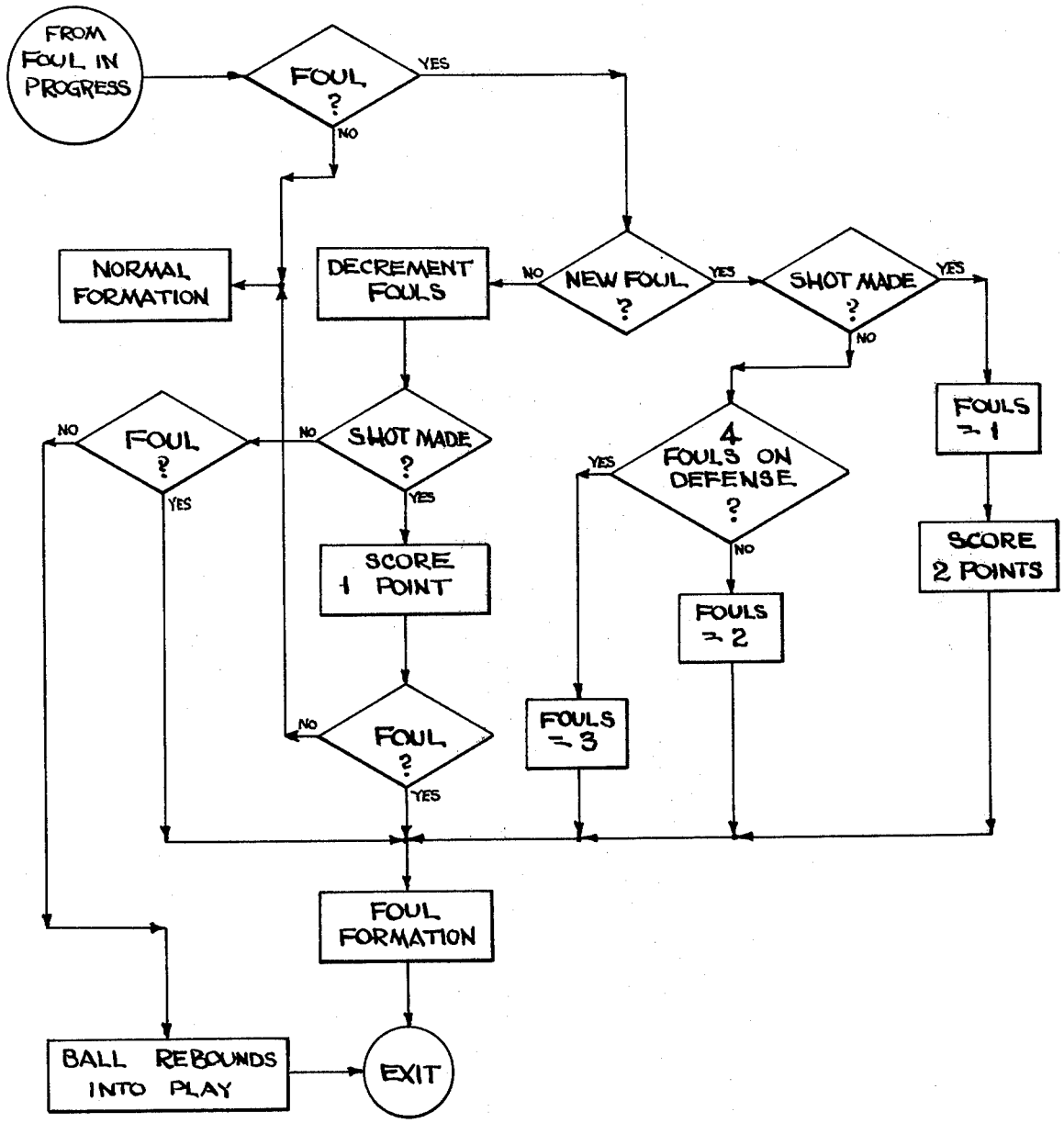

FIG. 13 illustrates the sub-routine for setting up the foul formation and executing foul shots in a preferred embodiment of the invention. The sub-routine is entered at the step shown in FIG. 12 at which it is determined whether, based on the probabilities, a foul occurred or not. At that decision step, if no foul occurred, the sub-routine shown in FIG. 12 is exited. This step is repeated and the exit is shown to be such that the display 18 illustrates the normal formation of play in FIG. 13.

If on the other hand, it is found that a foul has occurred during a shot, the program moves to a step in which it is determined whether the shooter has just been fouled and the ball B is still traveling toward the basket. If this is the case, the program moves to determine whether the shot being taken is good or not. If the shot is not good, the program moves to a decision step to determine whether four fouls have been called on the defense during the quarter. If less than four fouls have been called, the program moves to store the information in memory that two fouls are to be shot and then sets up the foul information. If four or more fouls have been registered, the program moves to store the information that three foul shots are to be taken and moves to set up the foul formation.

In a simplified embodiment, the step in which it is determined whether there are four fouls on the defense and the for the award of three foul shots may be eliminated; and the program moves to award only two foul shots in any case in which a basket is missed and the shooter is fouled.

If on the other hand the original basket was good, the program moves to store the information that only one foul shot is to be taken, to score two points for the offense, and to set up the foul formation.

If a foul situation exists but the shooter has not just been fouled, the program moves to decrement the number of fouls to be shot because the shot which has just been taken is a foul shot. The program then moves to determine whether the foul shot was good. If the shot was good, the program moves to register one point scored and to a decision step where it is determined whether the foul situation still exists. A foul situation will exist if this is the first of two or three foul shots or the second of three foul shots and less than two foul shots have been previously scored. The program then moves to reestablish the foul formation. If it is found that the foul situation no longer exists (i.e., all foul shots have been taken), the program moves to reestablish the normal formation.

If the foul shot being taken is not good, the program moves to a decision step in which it is determined whether the foul situation still exists as explained above. If the situation still exists, the program moves to reestablish the foul formation. if the foul situation no longer exists, the program moves to rebound the ball B off the basket and place the ball B in play.

Once the foul formation has been established, the program exits the sub-routine to await the depression of the shoot key 25.

As will be understood by those skilled in the art, many different programs may be utilized to implement the flow charts disclosed in this specification. Obviously, those programs will vary from one another in different degrees. However, it is well within the skill of the art of the computer programmer to provide particular programs for implementing each of the steps of the flow charts disclosed herein. It is also to be understood that various microcomputer circuits might be programmed for implementing each of the steps of the flow charts disclosed herein without departing from the teaching of the invention. It is therefore to be understood that, because various other embodiments may be devised by those skilled in the art without departing from the spirit and scope of the invention, it is the intention of the inventors to be limited only by the scope of the claims appended hereto.

What is claimed is:

1. An electronic basketball game comprising a display, including a representation of a basket, input means, and means for controlling the display to represent offensive and defensive players and a ball, the means for controlling the display being responsive to the input means for moving the representations of the defensive players, and in which the means for controlling the display includes means for causing the display to provide scores for the teams, means for determining the distance from the basket to a player shooting a field goal, and means for determining the point value of a field goal as a function of the distance from the basket to the player shooting the field goal.

2. An electronic basketball game as in claim 1 wherein the display comprises a matrix of devices each of which may be lit to represent a player or a ball.

3. An electronic basketball game as in claim 1 wherein the input means includes means for causing the means for controlling the display to move the ball on the display in four coordinates and at a forty-five degree angle between each of the coordinates.

4. An electronic basketball game as in claim 1 in which the means for controlling the display includes means for exchanging the players on offensive and defensive if a shot is not taken after a prescribed period of play.

5. An electronic basketball game comprising a display, input means, and means for controlling the display to represent offensive and defensive players and a ball, the means for controlling the display being responsive to the input means for moving the representations of the defensive players in multiple defenses, and in which the means for controlling the display includes means for determining whether a foul is committed during a shot and for setting up a foul shot formation in response to the commission of a foul, and means for selectively providing different numbers of foul shots.

6. An electronic basket ball game comprising a display including a representation of a basket and means for designating an area of the display adjacent the basket, input means, and means for controlling the display to represent offensive and defensive players and a ball, the means for controlling the display being responsive to the input means for moving the representations of the defensive players and in which the means for controlling the display includes position determining means for determining the position of an offensive ball handler, means for establishing a prescribed time period, and means responsive to the position determining means for exchanging the players on offense and defense if the offensive ball handler remains within the designated area of the display for longer than the prescribed period.

7. A portable electronic basketball game comprising a rectangular matrix of illuminable elements, control means for activating selectable ones of the illuminable elements to represent offensive and defensive players and a ball, the control means including means for lighting different ones of the illuminable elements so that particular players appear to move defensive against offensive players, input means for causing the control means to light different ones of the elements so that an offensive player appears to move under control of the input means, and other input means for lighting different ones of the illuminable elements so that a ball appears to move in a shot at a basket or in a pass to another offensive player under control of the other input means, and further comprising means superimposed on the matrix for indicating a distance from a basket within which field goals are awarded a first point value and beyond which field goals are awarded a second point value.

8. A portable electronic basketball game as in claim 7 in which the control means comprises means for exchanging offensive and defensive teams upon the running of a prescribed period during which the offensive players have controlled the ball without shooting.

9. A portable electronic basketball game comprising a rectangular matrix of illuminable elements, control means for activating selectable ones of the illuminable elements to represent offensive and defensive players and a ball, the control means including means for lighting different ones of the illuminable elements so that particular players appear to move defensive against offensive players, input means for causing the control means to light different ones of the elements so that an offensive player appears to move under control of the input means, and other input means for lighting different ones of the illuminable elements so that a ball appears to move in a shot at a basket or in a pass to another offensive player under control of the other input means, and further comprising means superimposed on the matrix to indicate a restricted area adjacent a basket, means for establishing a prescribed time period, and means in the control means for exchanging the offensive and defensive teams when an offensive player handling the ball remains in the restricted area for longer than the prescribed period.

10. A portable electronic basketball game comprising a rectangular matrix of illuminable elements, control means for activating selectable ones of the illuminable elements to represent offensive and defensive players and a ball, the control means including means for lighting different ones of the illuminable elements so that particular players appear to move defensive against offensive players, input means for causing the control means to light different ones of the elements so that an offensive player appears to move under control of the input means, and other input means for lighting different ones of the illuminable elements so that a ball appears to move in a shot at a basket or in a pass to another offensive player under control of the other input means, and in which the control means comprises means for determining that a foul has occurred during a shot, means for setting up a foul shooting formation, and means for awarding a different number of foul shots to the offensive team depending on the circumstances of play.

11. A portable electronic basketball comprising a rectangular matrix of illuminable elements, control means for activating selectable ones of the illuminable elements to represent offensive and defensive players and a ball, the control means including means for lighting different ones of the illuminable elements so that particular players appear to move defensive against offensive players, input means for causing the control means to light different ones of the elements so that an offensive player appears to move under control of the input means, and other input means for lighting different ones of the illuminable elements so that a ball appears to move in a shot at a basket or in a pass to another offensive player under control of the other input means, and in which the control means comprises means for establishing first and second time periods, means for exchanging offensive and defensive teams upon the running of the first prescribed period during which the offensive players have controlled the ball without shooting, and further comprising means superimposed on the matrix to indicate a restricted area adjacent a basket, and means in the control means for exchanging the offensive and defensive teams when an offensive player handling the ball remains in the restricted area for longer than the second prescribed period.

12. An electronic basketball game comprising a display; input means; means for partitioning the display into first, second, and third zones; and means for controlling the display to represent offensive and defensive players and a ball, the means for controlling the display being responsive to the input means for moving the representations of the defensive players, and including means for causing all of the defensive players to move toward the basket whenever an offensive ball handler is within the first zone, means for causing the defensive players to move between the offensive ball handler and an offensive receive whenever the offensive ball handler is within the second zone, and means for causing the defensive players to move in a random manner whenever the offensive ball handler is within the third zone.

13. An electronic basketball game comprising a display including a representation of a basket, input means, and means for controlling the display to represent offensive and defensive players and a ball, the means for controlling the display being responsive to the input means for moving the representations of the defensive players and for moving the representation of the ball as a shot at the basket, and in which the means for controlling the display includes means for determining whether a foul is committed during a shot.

14. An electronic basketball game as in claim 13 in which the means for controlling the display further includes means for setting up a foul shot formation in response to the commission of a foul.

15. An electronic basketball game comprising a display, input means, means for designating first and second teams, means for controlling the display to represent offensive and defensive players and a ball, the means for controlling the display being responsive to the input means for moving the representations of the defensive players, means for determining the respective scores of the first and second teams, means for establishing a predetermined interval of time, means for terminating the game after a predetermined interval of time has elapsed if the scores are not tied, and means for continuing the game beyond the predetermined interval of time if the scores are tied.

* * * * *